June 7, 1960 P. J. KROMBERG 2,939,682
POSTHOLE DIGGER ATTACHMENT FOR TRACTOR
Filed Jan. 8, 1958 2 Sheets-Sheet 1
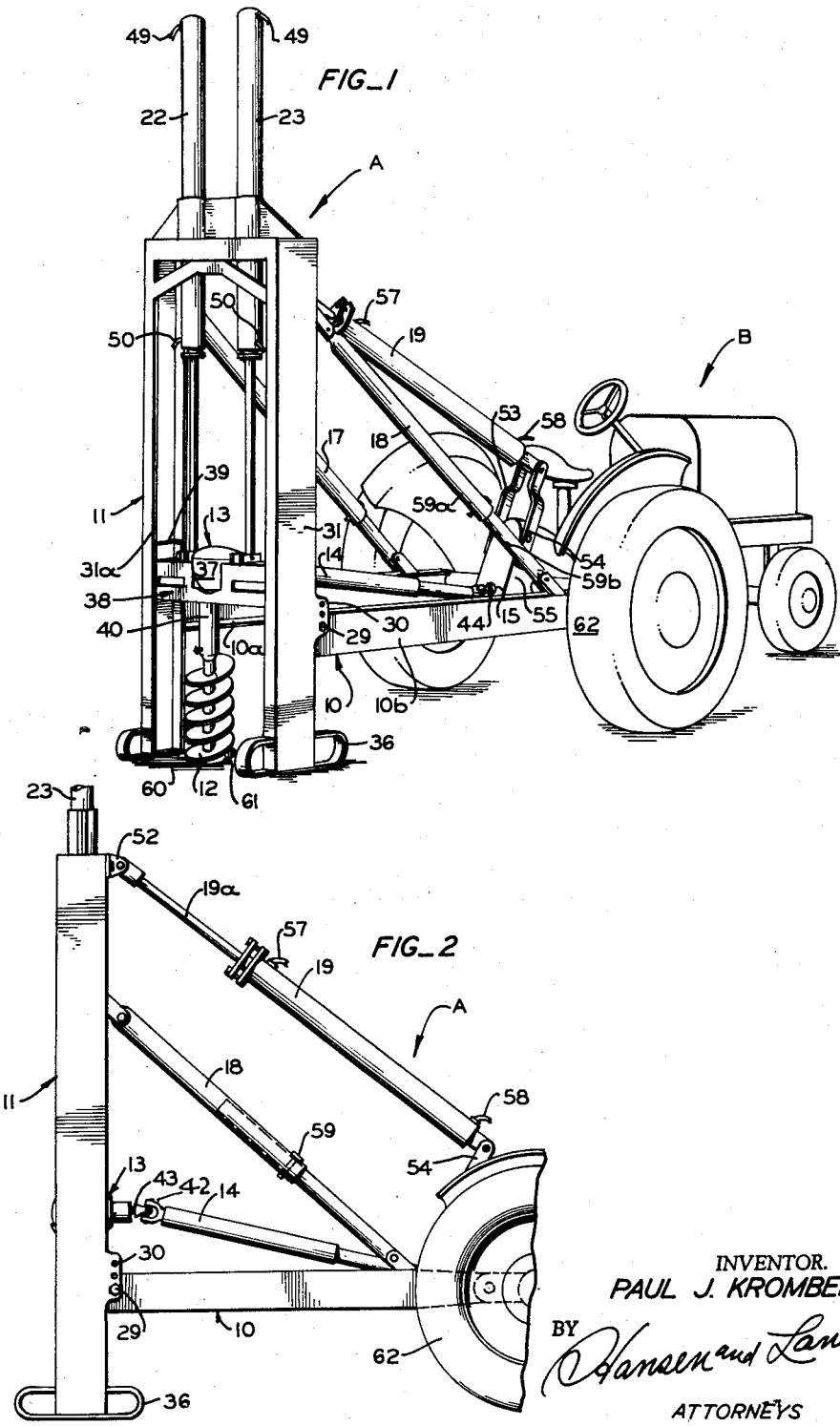
INVENTOR.
PAUL J. KROMBERG
BY Hansen and Lane
ATTORNEYS June 7, 1960
P. J. KROMBERG
2,939,682
POSTHOLE DIGGER ATTACHMENT FOR TRACTOR
Filed Jan. 8, 1958
2 Sheets-Sheet 2
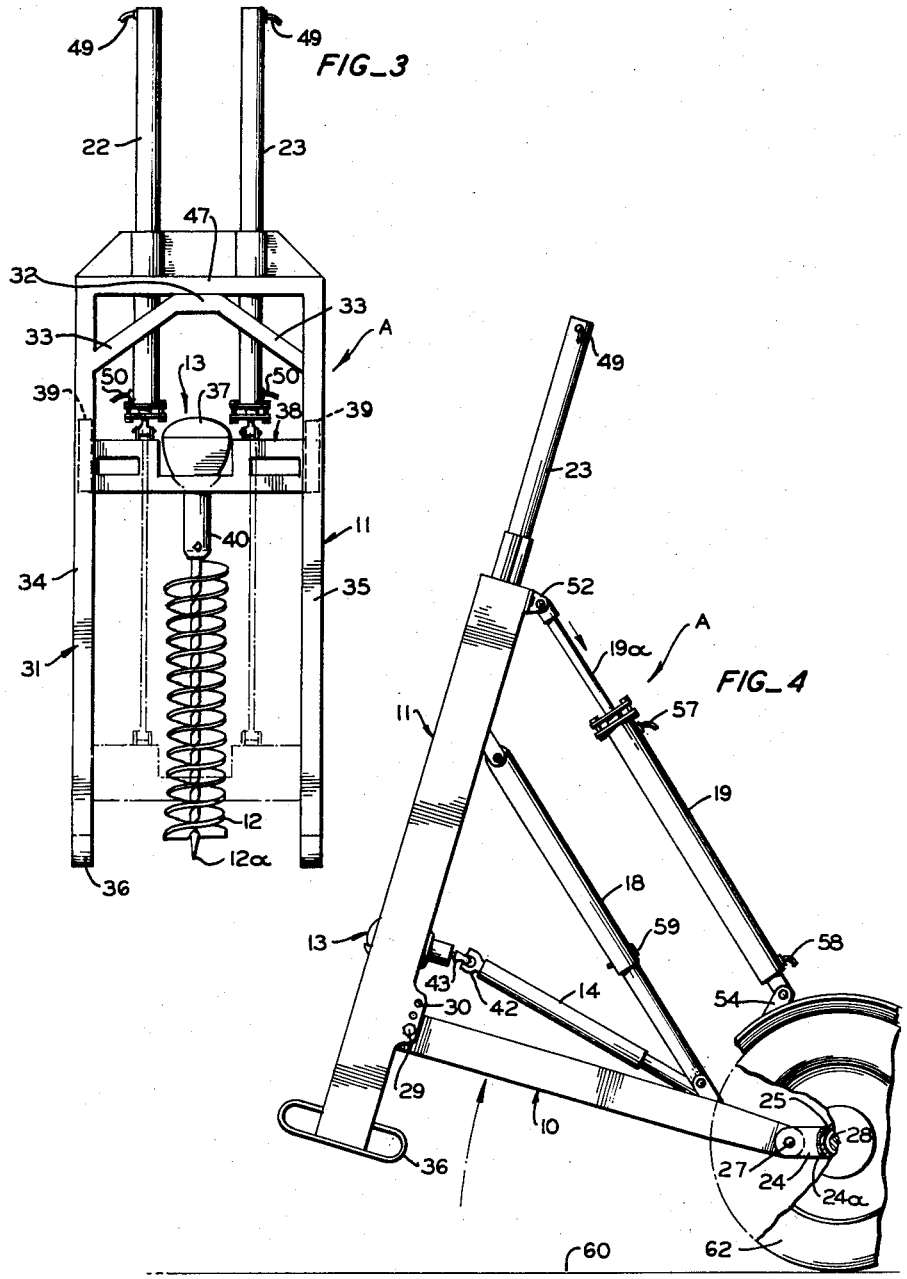
INVENTOR.
PAUL J. KROMBERG
BY Hansen and Lane
ATTORNEYS

United States Patent Office 2,939,682
Patented June 7, 1960

2,939,682
POSTHOLE DIGGER ATTACHMENT FOR TRACTOR

Paul J. Kromberg, 3105 Jennifer Way, San Jose, Calif.

Filed Jan. 8, 1958, Ser. No. 707,707

3 Claims. (Cl. 255—22)

The present invention relates to an earth boring auger, and pertains more particularly to a posthole auger adapted to be mounted on a tractor equipped with hydraulic mechanism.

In the past, various arrangements have been made for mounting an earth boring auger on a tractor, but some of these prior devices have difficult to transport over rough or uneven terrain, and are incapable of exerting sufficient downward pressure on the auger to penetrate hardpan and hard, adobe-type soils.

The present invention has for its object the provision of a simple, sturdy, hydraulically operated, earth boring auger adapted to be mounted on a wheeled, power-driven vehicle. The invention also provides an improved earth boring attachment for mounting on a tractor having hydraulic control mechanism thereon.

These, and other objects and advantages of the invention, will be apparent from the following description and the accompanying drawings, consisting of two sheets, wherein:

Fig. 1 is a perspective, rear quarter view showing an earth boring attachment embodying the present invention, as it appears when mounted on a tractor and in the process of boring a hole, the removed earth being omitted, however, to avoid obstructing the drawing.

Fig. 2 is a side elevational view of the earth boring attachment shown in Fig. 1, portions of the tractor also being included.

Fig. 3 is a rear elevational view of the earth boring mechanism shown in Figs. 1 and 2 with the boring head raised to its uppermost limit of movement.

Fig. 4 is a view similar to Fig. 2, but showing the entire earth boring attachment swung upwardly clear of the ground.

Briefly, an earth boring attachment A embodying the present invention comprises a horizontal supporting frame 10 hingedly connected to the rear end of a tractor B, and having an upright auger supporting farme 11 secured in adjusted position to the rear end thereof. An earth boring auger 12 is journaled in a boring head 13 which is mounted for slidable movement along the upright frame 11, and is driven by a telescoping, splined shaft 14 from the usual tractor power take-off shaft 15. Telescopically adjustable braces 17 and 18 secure the upright frame 11 in angularly adjusted relation to the horizontal frame 10.

A hydraulic cylinder 19, linked between the upright frame 11 and the tractor, may be used to adjust the relative angular position of the horizontal frame 10 to the upright frame 11 when the braces 17 and 18 are freed for telescoping movement. When these angularly disposed braces are secured against telescopic adjustment, operation of the cylinder 19 may be used to adjust the angular position of the entire attachment A relative to the tractor B, and to urge the upright frame 11 downwardly to force the auger 12 to cut into hard earth.

Slidable movement of the boring head 13 along the upright frame 11 is controlled by a pair of axially upright hydraulic cylinders 22 and 23 mounted in the upper end of the upright frame 11.

Referring to the drawings in detail, a conventional tractor B, which is here illustrated as being of the wheeled type, is provided with a pair of attachment mounting brackets 24 (Fig. 4) secured to the rear axle housing 25 of the tractor as by welding 24a. A transversely extending support shaft 27 is mounted in the brackets 24 parallel to the rear tractor axle 28, and provides pivotal support for the horizontal frame 10 comprising two horizontal frame members 10a and 10b.

The upright frame 11 is secured by bolts 29 inserted in a selected one of a plurality of holes 30 provided in the upright frame 11. By inserting these bolts 29 in a selected one of these holes 30, and in a hole, not shown, provided therefor in the members 10a and 10b, the vertical position of the upright frame 11 relative to the rear end of the horizontal frame 10 may be adjusted.

The upright frame 11 consists of an inverted U-shaped body 31 of channel steel with the flanges 31a thereof (Fig. 1) extending inwardly. An upper brace member 32, secured centrally to the frame 11 and having diagonal portions 33 thereof secured to the side legs 34 and 35, rigidly retains the upright frame 11 against distortion. A pair of runner-like shoes 36 are provided, one on the lower end of each leg 34 and 35 to provide suitable bearing support for the legs 34 and 35 on soft ground, and to permit slidable adjustment of the attachment along the ground for centering the auger 12 over a desired hole center.

The boring head 13 is mounted transversely, and for vertical slidable movement, within the channel side legs 34 and 35. The boring head 13 comprises a gearbox 37 of conventional type which is fixedly mounted on a rigid transverse head frame 38. The head frame 38 has a pair of upright, channel guide members 39 welded one on each end thereof, these channel guide members being sufficiently smaller than the channels of the side legs 34 and 35 to fit slidably therein. A vertical auger socket chuck 40, driven from the gearing, not shown, in the gearbox 37 projects downwardly therefrom, and the conventional, earth boring auger 12 is chucked coaxially therein.

A first universal joint 42 (Figs. 2 and 4) connects the rear end of the splined, telescoping, auger drive shaft 14 to the forward end of the drive shaft 43 of the gearbox 37, and a second universal joint 44 (Fig. 1) connects the forward end of the splined shaft 14 to the usual power take-off shaft 15 of the tractor B.

Vertical movement of the boring head 13 is controlled by the hydraulic cylinders 22 and 23, which are fixedly secured in the transverse upper member 47 and the top brace member 32 of the upright frame 11. Operation of the hydraulic cylinders 22 and 23 is through conventional flexible hydraulic liquid conduit tubes 49 and 50, which are provided on the upper and lower ends, respectively, of each cylinder 22 and 23. In the drawings, these as well as all other hydraulic tubes shown, are broken away, but are connected in a conventional manner to the usual hydraulic system, not shown, of the tractor B. Such tubes and hydraulic systems are well known, and since their details are not important to the present invention, they are not illustrated or described herein.

For swinging the entire earth boring attachment A upwardly or downwardly about the pivotal mounting shaft 27, and also for exerting downward pressure on the upright frame 11 during an earth boring operation, the hydraulic cylinder 19 in linked between a bracket 52 secured to the upper end of the upright frame 11, and a pair of strong metal arms 53 and 54, which are secured at their lower ends to a rigid tractor frame element, such as the housing 55 (Fig. 1). Hydraulic liquid conduit tubes 57 and 58, which are broken away in the drawings, are connected from the tilt-adjusting cylinder 19 in a conventional manner to the hydraulic system, not shown, of the tractor B.

In using the earth boring attachment of the present invention, the forward ends of the two horizontal frame members 10a and 10b are hingedly connected, by the shaft 27, to the brackets 24 secured, as by welding 24a, to the tractor rear axle housing 25, the hydraulic cylinder 19 is linked between the bracket 52 and the arms 53 and 54 and the various hydraulic tubes 49, 50, 57 and 58 are connected in a well known manner to the hydraulic system, not shown, of the tractor B with which the attachment A is to be used, so as to supply pressurized hydraulic fluid as required to selected ends of selected cylinders, and to vent the hydraulic tubes from the opposite ends of such cylinders.

The connection of the rear ends of the horizontal frame members 10a and 10b to the upright frame 11 by the bolts 29 may be adjusted as required by removing the bolts 29 and reinserting them in selected holes 30 in the side legs 34 and 35.

The side braces 17 and 18 may be freed for telescopic adjustment by removing the pins 59 therefrom, after which the upright frame 11 may be adjusted, by means of the hydraulic cylinder 19, to a desired angle relative to the horizontal frame 11. The pins 59 then may be reinserted in aligned holes 59a and 59b (Fig. 1) in the two relatively axially extensible brace members 17 and 18 to secure the latter members in telescopically adjusted position.

By supplying pressurized hydraulic liquid to the lower tubes 50 of the upright cylinders 22 and 23, the boring head 13 may be elevated to raise the auger 12 above the lower ends of the upright frame 11, to the position, for example, shown in Fig. 3.

For transporting the tractor B with the attachment A mounted thereon from one location to another, hydraulic fluid under pressure is introduced in a usual manner to the upper tube 57 of the hydraulic cylinder 19, thereby retracting the piston rod 19a and swinging the attachment A upwardly about the shaft 27 as a pivot to the position shown in Fig. 4.

The tractor B then may be driven to a desired location, the upright frame 11 located approximately over the point where a hole is to be dug, and the piston rod 19a of the hydraulic cylinder 19 extended to the position thereof shown in Fig. 2, thereby lowering the attachment A to bring the shoes 36 of the upright frame 11 into contact with the ground 30. The runner-like shape of the shoes 36 permits them to be moved slidably along the ground for forward or rearward adjustment of the attachment A as required to center the auger point 12a at the desired center of a hole 61 to be dug. The power take-off shaft 15 of the tractor B then may be energized in a well known manner to rotate the auger 12 and, upon a lowering of the boring head 13 by the upper hydraulic cylinders 22 and 23, to drill the hole 61.

Substantial downward pressure may be exerted on the upright frame 11 during a boring operation in the event that hard ground is encountered, by admitting pressurized hydraulic fluid to the lower tube 58, of the cylinder 19 to urge the piston rod 19a outwardly. Sufficient pressure is available by means of the hydraulic system on most conventional tractors having hydraulic control mechanism embodied therein to transfer the entire weight from the rear wheels 62 of the tractor B to the upright frame 11. This pressure successfully forces the auger 12 through even very dry, hard ground, which, without the exertion of such pressure, would cause the auger to simply rotate without penetration.

The invention provides a sturdy, simple, and rugged boring attachment, which can be easily mounted on any suitable tractor having conventional hydraulic control mechanism mounted thereon. The tractor B, with the attachment A mounted thereon, may be easily and quickly transported from one location to another by elevating the attachment A to the position shown in Fig. 4, in which position it will clear even very rough terrain over which the tractor may be driven.

The arrangement also permits simple and rapid adjustment of the angular position of the upright frame 11 relative to the horizontal frame 10 as explained previously herein in the event that the tractor should be, for example, headed up or down a slope.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A posthole digger attachment for a tractor having a power take-off shaft thereon, said attachment comprising a longitudinally extending frame, means for hingedly attaching one end of said longitudinally extending frame to a tractor for vertical swinging movement about a horizontal axis, an upright auger support frame of inverted U shape hingedly connected to the other end of said longitudinally extending frame and extending therebelow a sufficient distance to have the lower ends of said support frame engage the ground upon which such tractor is supported, longitudinally adjustable diagonal brace means interconnecting the horizontal and upright frames in angularly adjusted condition, a boring head mounted for guided movement lengthwise between the sides of the upright frame, an earth boring auger operatively connected to the boring head with the auger axis parallel to the upright frame, telescoping drive means operatively connected to the boring head and adapted to be connected to the power take-off shaft of a tractor to which the digger is attached, a pair of hydraulic cylinders secured in spaced, axially parallel relation to the transverse top portion of the upright frame, a piston rod operatively mounted in each of said cylinders and extending downwardly therefrom, the lower ends of said piston rods being connected to the boring head, a hydraulic cylinder and piston rod assembly pivotally connected at one end thereof to an upper portion of the upright frame and adapted to be pivotally connected at the other end thereof to a fixed tractor element off-set vertically from the hinged connection of the longitudinally extending frame thereto, whereby, extension and retraction of their piston rods by said pair of cylinders moves the boring head positively downwardly and upwardly along the upright frame, and retraction and extension of said cylinder and piston rod assembly swings the entire attachment between an upwardly tilted condition with the lower ends of the upright frame clear of the ground, and a downswung position with the lower ends of the upright frame in forced engagement with the ground.

2. A posthole digger attachment for a tractor having a power take-off shaft thereon, said attachment comprising a longitudinally extending frame, means for hingedly attaching one end of said longitudinally extending frame to a tractor for vertical swinging movement about a horizontal axis, an upright auger support frame of inverted U shape hingedly connected to the other end of said longitudinally extending frame and extending therebelow a sufficient distance to have the lower ends of said support frame engage the ground upon which such tractor is supported, longitudinally adjustable diagonal brace means interconnecting the horizontal and upright frames in angularly adjusted condition, a boring head mounted for guided movement lengthwise between the sides of the upright frame, an earth boring auger operatively connected to the boring head with the auger axis parallel to the upright frame, telescoping drive means operatively connected to the boring head and adapted to be connected to the power take-off shaft of a tractor to which the digger is attached, a first hydraulic cylinder secured to the transverse top portion of the upright frame, a first piston rod operatively mounted in said cylinder and extending downwardly therefrom, the lower end of said first piston rod being connected to the boring head, a second hydraulic cylinder and piston rod assembly pivotally connected at one end thereof to an upper portion of the upright frame and adapted to be pivotally connected at the other end thereof to a fixed tractor element off-set vertically from the hinged connection of the longitudinally extending frame thereto, whereby, extension and retraction of its piston rod by the first cylinder moves the boring head positively downwardly and upwardly along the upright frame, and retraction and extension of its piston rod by the second cylinder swings the entire attachment between an upwardly tilted condition with the lower ends of the upright frame clear of the ground, and a downswung position with the lower ends of the upright frame in forced engagement with the ground.

3. An arrangement according to claim 2 wherein the first hydraulic cylinder extends substantially above the top of the upright frame.

References Cited in the file of this patent

UNITED STATES PATENTS

| | | |
|---|---|---|
| 2,334,312 | Caldwell | Nov. 16, 1943 |
| 2,774,568 | Jones | Dec. 18, 1956 |
| 2,810,550 | Cohen et al. | Oct. 22, 1957 |

FOREIGN PATENTS

| | | |
|---|---|---|
| 736,695 | Great Britain | Sept. 14, 1955 |